(12) United States Patent
Ranganathan et al.

(10) Patent No.: US 9,910,655 B1
(45) Date of Patent: Mar. 6, 2018

(54) SECURE CONTENT PLATFORM SOFTWARE DEVELOPER KIT

(71) Applicant: Accellion, Inc., Palo Alto, CA (US)

(72) Inventors: Vidhya Ranganathan, Saratoga, CA (US); Stanley Liu, Fremont, CA (US); Erik Thompson, Brier, WA (US)

(73) Assignee: Accellion, Inc., Palo Alto, CA (US)

( * ) Notice: Subject to any disclaimer, the term of this patent is extended or adjusted under 35 U.S.C. 154(b) by 141 days.

(21) Appl. No.: 14/933,710

(22) Filed: Nov. 5, 2015

Related U.S. Application Data

(60) Provisional application No. 62/075,907, filed on Nov. 6, 2014.

(51) Int. Cl.
G06F 9/445 (2006.01)
G06F 21/62 (2013.01)

(52) U.S. Cl.
CPC ............ G06F 8/61 (2013.01); G06F 21/6245 (2013.01)

(58) Field of Classification Search
CPC .............................. G06F 8/61; G06F 21/6245
USPC ......................................................... 717/174
See application file for complete search history.

(56) References Cited

U.S. PATENT DOCUMENTS

| | | | | |
|---|---|---|---|---|
| 6,532,542 B1 * | 3/2003 | Thomlinson | ........ | G06F 21/6245 713/167 |
| 6,785,810 B1 * | 8/2004 | Lirov | ............... | G06F 21/606 713/193 |
| 6,941,454 B1 * | 9/2005 | Spraggs | ............... | G06F 21/606 713/150 |
| 7,440,571 B2 * | 10/2008 | Sasselli | ................ | H04L 9/0891 348/E5.006 |
| 7,979,697 B2 * | 7/2011 | Phillips, II | ............ | H04L 63/045 713/160 |
| 8,515,070 B2 * | 8/2013 | Juels | ...................... | A61B 5/0031 340/10.1 |
| 2001/0019614 A1 * | 9/2001 | Madoukh | .......... | G06F 17/30067 713/165 |
| 2005/0086479 A1 * | 4/2005 | Ondet | ...................... | G06F 21/10 713/172 |
| 2007/0064943 A1 * | 3/2007 | Ginter | ...................... | G06F 21/10 380/233 |

(Continued)

OTHER PUBLICATIONS

Ateniese at el. "Improved Proxy Re-encryption Schemes with Applications to Secure Distributed Storage", ACM, vol. 9, No. 1, Feb. 2006, pp. 1-30.*

(Continued)

*Primary Examiner* — Wei Zhen
*Assistant Examiner* — Junchun Wu
(74) *Attorney, Agent, or Firm* — Raubvogel Law Office

(57) ABSTRACT

A system and method may be used to manipulate secure content on a first computing device through the use of a software developer's kit. The method may include defining a secure container as a subset of a data store of the first computing device. First instructions of the software developer's kit may be executed to retrieve the secure content from a first content source of a plurality of content sources managed by a plurality of different entities. The secure content may be stored in the secure container. At an input device, user input may be received to initiate manipulation of the secure content in a manner that avoids storage of any of the secure content on a portion of the data store outside the secure container.

27 Claims, 10 Drawing Sheets

(56) References Cited

U.S. PATENT DOCUMENTS

| | | | | |
|---|---|---|---|---|
| 2007/0165844 A1* | 7/2007 | Little | G06F 21/6245 | 380/30 |
| 2007/0294710 A1* | 12/2007 | Meesseman | G06F 8/36 | 719/328 |
| 2010/0214595 A1* | 8/2010 | Chapman | H04N 1/00867 | 358/1.15 |
| 2011/0138191 A1* | 6/2011 | Bond | G06F 21/32 | 713/189 |
| 2011/0247057 A1* | 10/2011 | Baentsch | G06F 21/84 | 726/5 |
| 2012/0072724 A1* | 3/2012 | Pizano | G06F 21/6245 | 713/165 |
| 2013/0054467 A1* | 2/2013 | Dala | G06F 19/322 | 705/51 |
| 2013/0159701 A1* | 6/2013 | Phillips, II | H04L 63/045 | 713/155 |
| 2013/0212700 A1* | 8/2013 | Grocutt | G06F 21/606 | 726/27 |
| 2014/0007048 A1* | 1/2014 | Qureshi | G06F 21/10 | 717/110 |
| 2014/0068737 A1* | 3/2014 | Micucci | H04L 63/029 | 726/7 |
| 2014/0282126 A1* | 9/2014 | Ma | G06F 8/34 | 715/762 |
| 2015/0180833 A1* | 6/2015 | Snow | G06F 21/6245 | 713/155 |
| 2015/0310485 A1* | 10/2015 | Brown | H04W 4/206 | 705/14.45 |

OTHER PUBLICATIONS

Barth et al. "Privacy in Encrypted Content Distribution Using Private Broadcast Encryption", Springer-Verlag Berlin Heidelberg, pp. 52-64, 2006.*

Miller et al. "Strong Security for Distributed File Systems", IEEE, 2001.*

Lauter et al. "The Advantages of Elliptic Curve Cryptography for Wireless Security", IEEE, Feb. 2004.*

* cited by examiner

SECURE CONTENT PLATFORM SOFTWARE DEVELOPER KIT

CROSS-REFERENCE TO RELATED APPLICATION

The present application claims priority from U.S. Provisional Application Ser. No. 62/075,907 for "Secure Content Platform Software Developer Kit," filed Nov. 6, 2014, which is incorporated by reference herein in its entirety.

TECHNICAL FIELD

The present document relates to a mobile content platform for building secure mobile applications to enable access to and collaboration on content stored on content sources behind a firewall or in the cloud.

DESCRIPTION OF THE RELATED ART

In today's world, content is sprawled in many places. Content sources include, for example, SharePoint, Documentum, and OpenText, which are situated behind a firewall, and SharePoint Online, Google Drive, Dropbox and Box, which are situated in the cloud (i.e., on remote servers). The content stored at these various content sources may be confidential, proprietary, and/or subject to privacy regulations. Accordingly, an enterprise may need to ensure that such content is kept secure.

Many users have a need to access such content from a variety of mobile devices, such as smartphones, tablets, and/or laptops. Many enterprises have a Bring Your Own Device (BYOD) policy, so that IT administrators and Chief Information Officers (CIOs) need to be able to support a wide variety of client devices that can access enterprise content. Unfortunately, many known enterprise solutions do not support the use of user-owned devices for accessing secure content. In many instances, the users must receive specialized, secure devices issued by the enterprise if they need access to secure content.

This deficiency exists, at least in part, because existing technologies generally do not provide the necessary tools to enable secure content to remain secure when viewed, modified, and/or otherwise utilized in connection with diverse device types. Enterprise File Sync and Share (EFSS) solution vendors generally do not provide a software development kit (SDK) that can provide a leak-proof secure container and/or productivity tools or editors that can be used to work with secure content.

SUMMARY

The present document describes a secure content platform that provides ubiquitous and secure access to content stored at any of a variety of commonly used cloud-based and on-premises secure data storage platforms. The secure content platform may enable users to collaborate internally as well as externally to an enterprise, and may enable content to remain secure on devices owned by the enterprise and users' own devices. Thus, the enterprise may implement a "Bring Your Own Device," or BYOD, policy without compromising the security of the secure content to be downloaded to the users' devices.

The secure content platform described herein may provide a secure container, as well as a secure productivity suite that helps ensure that data is not leaked out of the secure container. Mobile SDK's may facilitate the development of custom mobile apps that similarly provide a secure container and/or a secure productivity suite in the context of various mobile device operating systems. Robust authentication mechanisms may be used to enable secure manipulation of secure content, including the ability to securely retrieve, store, manipulate, and/or delete the secure content.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION OF THE EMBODIMENTS

In at least one embodiment, the system and method described herein provide a software developer's kit (SDK) that can be used to implement a secure content platform by which secure content from various sources can be manipulated in various ways without compromising the security of the secure content. The software developer's kit may facilitate development of applications on various computing devices, which may include mobile devices such as smartphones, tablets, phablets, and wearables based on iOS, Android, Windows, and/or other mobile operating systems.

In this application, a "software developer's kit" is a set of computer instructions that simplify and/or otherwise facilitate the development of software by providing a set of protocols, functions, and/or other tools that can be used by the software developer. An application programming interface (API) is a set of tools, routines, and/or protocols that facilitate the development of software for a specific purpose. A software developer's kit may include one or more API's and/or may be designed to function in conjunction with one or more API's external to the software developer's kit.

In this application, "secure content" is any digitally stored information for which a user desires to limit access, modification, and/or distribution privileges. A "secure content platform" is a set of software-based tools that can be executed, or used to generate custom software that can be executed, on one or more computing systems to facilitate the manipulation of secure content in a manner that helps retain security of the secure content.

Figure 1A:
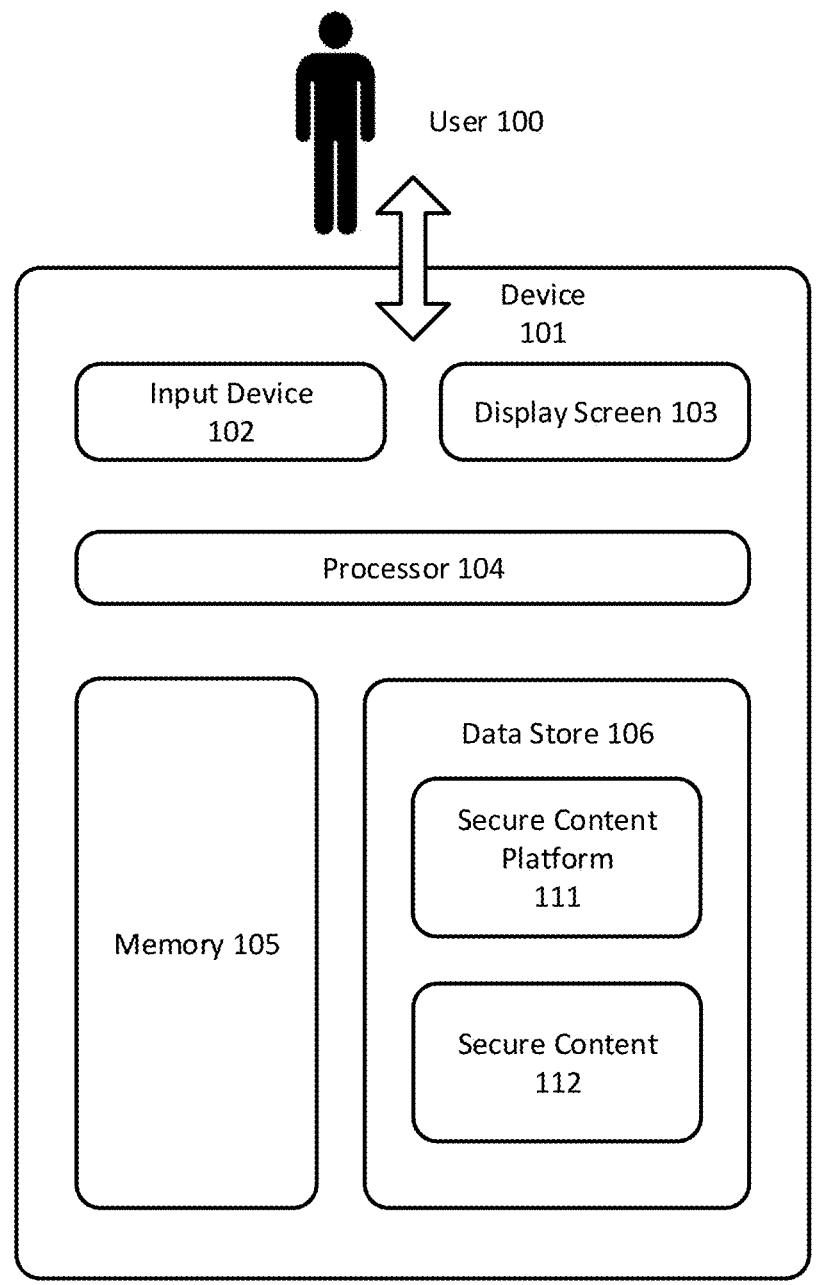
FIG. 1A is a block diagram depicting a hardware architecture according to one embodiment.
Figure 1B:
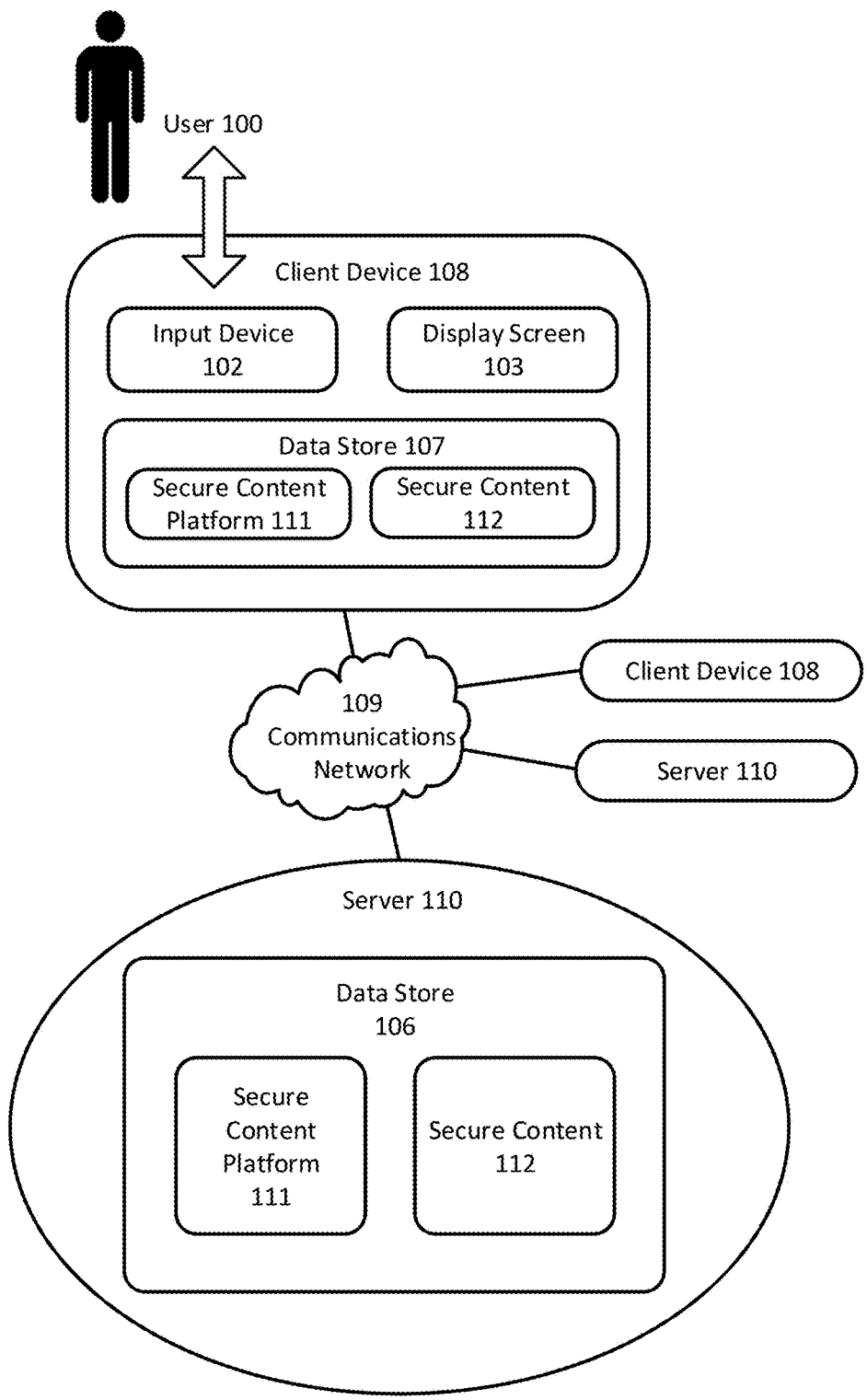
FIG. 1B is a block diagram depicting a hardware architecture in a client/server environment, according to one embodiment.

In some embodiments, one or more devices 101 and/or client devices 108, as shown and described in FIGS. 1A and 1B, may be used to implement such a system and method. Thus, in the figures and descriptions below, it will be understood that any of the components and/or method steps shown or described may be implemented in one or more of the devices 101 and/or client devices 108. Further, the functions and/or method steps set forth below may be carried out by software running on the one or more of the devices 101 and/or client devices 108. This software may optionally be multi-function software that is used to retrieve, store, manipulate, and/or otherwise use secure content and/or carry out one or more other functions. This software will be referred to as a "secure content platform."

System Architecture

According to various embodiments, the system can be implemented on any one or more electronic devices equipped to receive, store, and present information. Such an electronic device may be, for example, a desktop computer, laptop computer, smartphone, tablet computer, smartphone/tablet ("phablet"), wearable computing device, or the like.

Although the system is described herein in connection with an implementation in a desktop computer, one skilled in the art will recognize that the techniques described herein can be implemented in other contexts, and indeed in any suitable device. Accordingly, the following description is intended to illustrate various embodiments by way of example, rather than to limit scope.

Referring now to FIG. 1A, there is shown a block diagram depicting a hardware architecture for practicing the described system, according to one embodiment. Such an architecture can be used, for example, for implementing the techniques of the system in a computer or other device 101. Device 101 may be any electronic device equipped to provide visual output.

In at least one embodiment, device 101 has a number of hardware components well known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech. In at least one embodiment, input device 102 can be omitted.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. Data store 106 may be implemented in a database or using any other suitable arrangement. In another embodiment, data store 106 can be stored elsewhere, and retrieved by device 101 when needed for presentation to user 100. Data store 106 may store one or more data sets, which may be used for a variety of purposes and may include a wide variety of files, metadata, and/or other data. In at least one embodiment, data store 106 may include a secure content platform 111 and/or secure content 112.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, via a cellular network, or by any other appropriate means. This communication with other electronic devices is provided as an example and is not necessary.

In at least one embodiment, data store 106 is detachable in the form of a CD-ROM, DVD, flash drive, USB hard drive, or the like. Information can be entered from a source outside of device 101 into a data store 106 that is detachable, and later displayed after the data store 106 is connected to device 101. In another embodiment, data store 106 is fixed within device 101.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100. In at least one embodiment, an identifying label is also stored along with each data entry, to be displayed along with each data entry.

Display screen 103 can be any element that graphically displays information such as the secure content 112 and user interface elements that can facilitate usage and/or manipulation of the secure content 112. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

Referring now to FIG. 1B, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from data store 106, reports, and/or other data derived from data store 106 can be presented as part of such web pages and/or other web-based resources, using known protocols and languages such as Hypertext Markup Language (HTML), Java, JavaScript, and the like.

Client device 108 can be any electronic device incorporating the input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data.

In this implementation, server 110 is responsible for data storage and processing, and incorporates data store 106.

Server 110 may include additional components as needed for retrieving data from data store 106 in response to requests from client device 108.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100. In at least one embodiment, an identifying label is also stored along with each data entry, to be displayed along with each data entry.

In at least one embodiment, data store 106 is organized in a file system. Appropriate indexing can be provided to associate data elements with each other. Data store 106 may include any of a wide variety of data structures known in the information storage arts, such as databases and other suitable data storage structures. As in FIG. 1A, data store 106 may include one or more data sets, which may include a secure content platform 111, secure content 112, and/or other data (not shown).

As shown, the secure content platform 111 and/or the secure content 112 may also be present in a data store 107 present in the client device 108. In some embodiments, the secure content platform 111 may have elements distributed between the server 110 and the client device 108 and/or other computing devices in order to facilitate secure communication between these computing devices. The secure content 112 may reside in the data store 106 of the server 110, but some or all of the secure content 112 may be downloaded to the data store 107 of the client device 108 in order to facilitate manipulation of the secure content 112 at the client device 108.

Display screen 103 can be any element that graphically displays information such as items from data store 106 and/or the results of steps performed on such items to provide information useful to a user. Such output may include, for example, images, facility maps or diagrams, charts, graphs, menus, navigational elements, queries requesting information or selections from the user, and/or the like. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software.

In one embodiment, some or all of the system can be implemented as software written in any suitable computer programming language, whether in a standalone or client/server architecture. Alternatively, it may be implemented and/or embedded in hardware.

Notably, multiple servers 110 and/or multiple client devices 108 may be networked together, and each may have a structure similar to those of the client device 108 and the server 110 that are illustrated in detail in FIG. 1B. Thus, the secure content 112 may be made available for collaboration to multiple geographically dispersed users of client devices 108.

Data Structures

In general, the data stored within data store 106 of FIG. 1A or FIG. 1B and/or the data store 107 of FIG. 1B may include one or more pieces of data, each of which may be of any desired length and format. Thus, each piece of data may be a character string, integer, floating point number, or any other type of data, and may thus represent any information such as names, times, dates, currency amounts, percentages, fractions, physical dimensions, or any other data that may desirably be stored in a computer. As mentioned previously, data store 106 and/or the data store 107 may include the secure content platform 111, secure content 112, and/or other data (not shown).

Figure 2A:
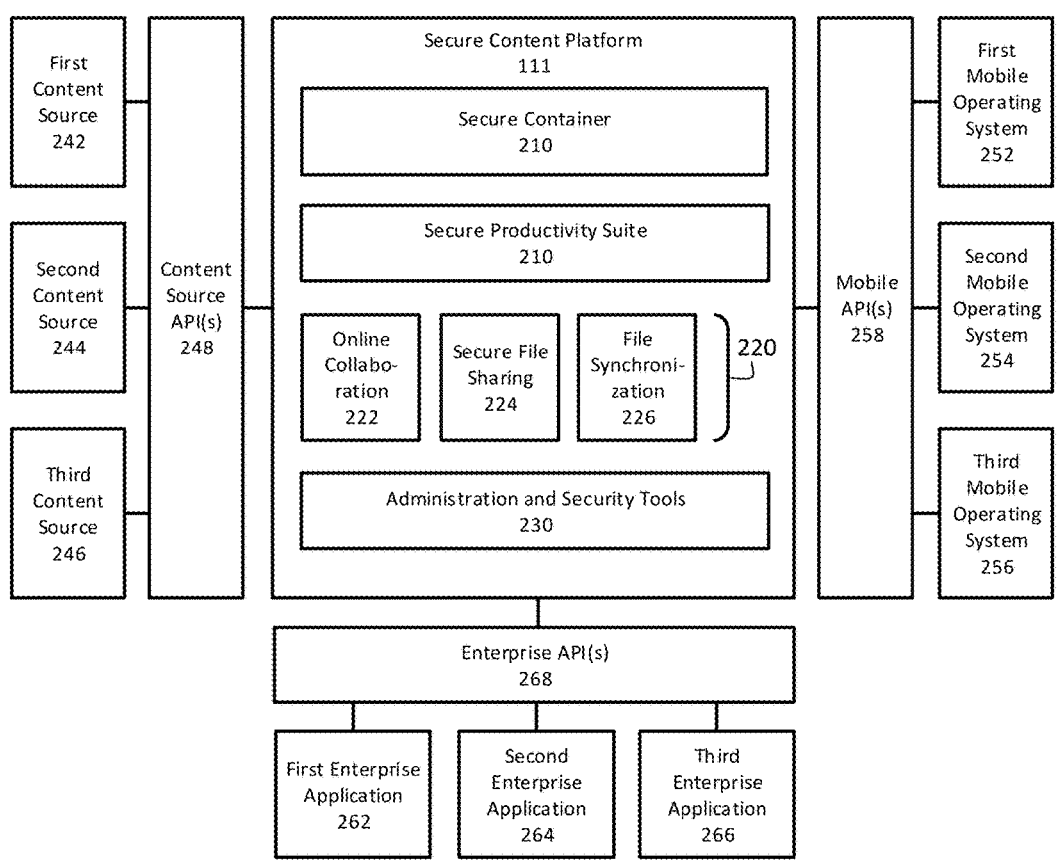
FIG. 2A is a block diagram depicting the secure content platform of FIGS. 1A and 1B, with related data structures, according to one embodiment.

Referring to FIG. 2A, a block diagram depicts the secure content platform 111 of FIGS. 1A and 1B, with related data structures, according to one embodiment. The secure content platform 111 may be established via execution of software developed through the use of a software developer's kit. The software developer's kit may have various tools that facilitate the development of the software that provides the secure content platform 111 and/or related data structures.

The secure content platform 111 may be the product provided by the maker of the SDK, and may provide interfaces that facilitate the development of custom applications by enterprises that wish to facilitate secure access to secure content 112. The secure content platform 111 may provide functionality around the secure content 112 and may provide security for the secure content 112 at rest and in transit (for example, between the client device 108 and the server 110).

In at least one embodiment, the secure content platform 111 may not be a single piece of software, but may rather be a collection of software tools, which may be installed and/or executed on multiple computing devices (such as one or more servers 110 and client devices 108) to provide the desired functionality. The secure content platform 111 may have one or more API's and/or SDK's with optimizations for mobile devices to enable such devices to effectively and securely use the secure content 112. The secure content platform 111 may optionally also have traditional web interfaces and/or custom integrations.

As indicated previously, parts of the secure content platform 111 may be stored on the client devices 108 and/or the servers 110. The discussion below assumes that the components of the secure content platform 111 are generally stored in the data store 107 of the client device 108. Thus, the secure content platform 111 may be implemented on the client device 108, with the server 110 used generally to supply the secure content 112. Those of skill in the art will recognize that this implementation is merely exemplary; in other embodiments, some or all of the secure content platform 111 may be implemented on the server 110. In such embodiments, the client device 108 may act more as a "dumb terminal," simply providing output generated and supplied by the server 110.

As shown, the secure content platform 111 may have a secure container 200, a secure productivity suite 210, collaboration tools 220, and administration and security tools 230. The secure container 200 may be a subset of memory (for example, a subset of the data store 107 of the client device 108) that is designated as a repository for the secure content 112. Any data stored in the secure container 200 may receive unique treatment intended to ensure that the secure content 112 is not distributed to any party or device that is not authorized to receive it.

In at least one embodiment, the secure container 200 is an encrypted virtual container, which can minimize or prevent data leaks. In at least one embodiment, the secure content 112 is downloaded only into the encrypted secure container.

The secure productivity suite 210 may be a suite of productivity tools that is designed to facilitate manipulation of the secure content 112. The secure productivity suite 210 may include any known productivity tools for data manipulation, including but not limited to word processors, graphics programs, spreadsheets, file conversion utilities, collaboration programs, and/or the like. The secure content platform 111 may operate such that the secure productivity suite 210, exclusively, can be used to retrieve, open, view, share, and/or otherwise manipulate the secure content 112, while prohibiting other productivity tools operating on the client device 108 from manipulating the secure content 112.

The secure productivity suite 210 may be designed to keep the secure content 112 secure. This may be done, for example, by performing steps such as, but not limited to:
   Avoiding storage of the secure content 112 anywhere outside the secure container 200;
   Restricting sharing of the secure content 112 to other parties and/or devices that are authorized to receive the secure content 112;
   Ensuring that any metadata or other indicators of security remain present on the secure content 112 at all stages of manipulation of the secure content 112; and/or
   Ensuring that certain standards for system security (for example, from hackers) are present, confirming the identity of the user of the client device 108.

In some embodiments, the secure productivity suite 210 may be used to create, edit, and/or annotate commonly used file types, such as Microsoft Office documents or PDF files. In at least one embodiment, a developer of custom software based on the secure content platform 111 can use the secure productivity suite 210 in the app being developed by the developer, so as to allow for viewing, editing and annotation of content. When the secure productivity suite 210 is used, it may read from and write back to the secure container 200. In addition, a developer developing a custom mobile app through the use of the SDK may use the secure productivity suite 210 to view, edit, and/or annotate the secure content 112 that has been downloaded to the client device 108, without the security hole of letting the developer obtain an uncontrolled copy.

In at least one embodiment, a developer developing a custom mobile app on the secure content platform 111 may use the SDK to make sure content downloaded by the user can only be viewed and edited in the secure productivity suite 210. That way, the user does not have unrestricted privileges to the secure content 112. Rather, the user may only have the privileges provided by the relevant administrator(s), the document owner(s), and/or the manager(s).

The collaboration tools 220 may be used to facilitate various collaborative activities involving the secure content 112. Such collaborative activities may be carried out in a manner that does not impair the security of the secure content 112. The collaboration tools 220 may include end-user functionality enabled by the secure content platform 111, either through native user interfaces, or through custom user interfaces implemented through the use of the enterprise application API's 268 or other API's, or through some combination thereof.

The collaboration tools 220 may include tools for online collaboration 222, secure file sharing 224, file synchronization 226, and/or other collaboration functions. Online collaboration 222 may include, for example, cooperation between users to edit a document or other file in a manner that permits a user to view and/or adjust changes made by one or more other users. Secure file sharing 224 may include, for example, enabling one user to send a file of the secure content 112 to another user in a manner that preserves the security of the shared file. File synchronization 226 may entail, for example, making automatic and/or manual updates to a file stored in the client device 108 used by a user based on changes made by one or more other users. The collaboration tools 220 may include any other tools known in the art that can facilitate cooperation of users as they work with the secure content 112.

The administration and security tools 230 may include various tools that facilitate administration of the secure content platform 111 and/or maintenance of the security of the secure content 112. Such tools may include tools that prevent improper sharing or storage of the secure content 112, as described above, tools that provide user authentication, tools that implement file transfer protocols between the client device 108 and the server 110, and the like.

Various API's may be used by the secure content platform 111 to provide compatibility with a wide variety of content sources, mobile devices, and enterprise applications. Such API's may be included in the secure content platform 111, or may be provided separately (for example, by the host or developer of the content source, the operating system maker of the mobile device, and/or the developer of the enterprise application). Thus, the SDK used to provide the secure content platform 111 may provide such API's, or may be designed to work with API's established by third parties.

As mentioned above, the secure content platform 111 may be designed to work with a variety of content sources, which may include cloud-based and/or on-premises content stores. By way of example, FIG. 2A illustrates a first content source 242, a second content source 244, and a third content source 246. Such content sources may include, but are not limited to:
   SharePoint;
   Documentum;
   Box;
   Google Drive; and
   Dropbox.

The secure content platform 111 may communicate with the first content source 242, the second content source 244, and/or the third content source 246 through the use of one or more content source API's 248. The content source API's 248 may facilitate usage of the first content source 242, the second content source 244, and/or the third content source 246 to manipulate the secure content 112. The content source API's 248 may be provided by the hosts or developers of the content sources (such as the hosts of the content sources listed above). Thus, the SDK may facilitate the generation of software that is compatible with a wide variety of cloud-based and local storage solutions commonly used by enterprises for data storage and collaboration.

As also mentioned above, the secure content platform 111 may be designed to work with a variety of mobile devices. By way of example, FIG. 2A illustrates a first mobile operating system 252, a second mobile operating system 254, and a third mobile operating system 256. Such mobile operating systems may include, but are not limited to:
   Android;
   iOS;
   Windows;
   Windows Mobile; and The secure content platform 111 may communicate with the first mobile operating system 252, the second mobile operating system 254, and/or the third mobile operating system 256 through the use of one or more mobile API's 258. The mobile API's 258 may facilitate usage of devices based on the first mobile operating system 252, the second mobile operating system 254, and/or the third mobile operating system 256 to manipulate the secure content 112. The mobile API's 258 may be provided by the developers of the mobile operating systems (such as Google, Apple, and Microsoft). Thus, the SDK may facilitate the generation of software that is compatible with a wide variety of devices and operating systems commonly used by enterprises and individuals. This may facilitate the implementation of a "Bring Your Own Device" (BYOD) policy in the secure content platform 111.

As further mentioned above, the secure content platform 111 may be designed to work with a variety of enterprise applications. These enterprise applications may be common large-scale applications that corporations use, such as Salesforce.com for managing their sales process, Jive for collaboration between employees, and/or a home-grown portal for disseminating information. The secure content platform 111 may have elements embedded in these products, and/or may share content with them via API's and/or custom code development. Multiple enterprise applications may cooperate to create an end-to-end workflow for a given user task. Elements of the secure content platform 111 may be embedded in one or more stages of the workflow to execute a process step and/or initiate workflow.

By way of example, FIG. 2A illustrates a first enterprise application 262, a second enterprise application 264, and a third enterprise application 266. Such enterprise applications may include, but are not limited to:
Microsoft Office;
Oracle;
SalesForce.com;
Google Drive; and
SharePoint.

The secure content platform 111 may communicate with the first enterprise application 262, the second enterprise application 264, and/or the third enterprise application 266 through the use of one or more enterprise application API's 268. The enterprise application API's 268 may facilitate usage of the first enterprise application 262, the second enterprise application 264, and/or the third enterprise application 266 to manipulate the secure content 112, if such usage is allowed by the security policy in effect for the secure content 112. The enterprise application API's 268 may be provided by the providers or developers of the enterprise applications (such as the developers of the content sources listed above). Thus, the SDK may facilitate the generation of software that is compatible with a wide variety of enterprise applications commonly used by enterprises to manipulate content.

The enterprise application API's 268 may provide access to the secure content 112, collaboration features for users such as comments and tasks, and/or the ability to structure, secure, and manage the secure content 112. The enterprise application API's 268 may also have features that facilitate administration of the system by which the secure content 112 is made available.

The content source API's 248, the mobile API's 258, and the enterprise application API's 268 are merely examples of API's that could be included in or used in conjunction with the secure content platform 111. In other embodiments, a wide variety of other API's may be used, including any that would be recognized by a person of skill in the art with the aid of the present disclosure.

In at least one embodiment, the API's provided by the depicted system follow the representational state transfer (REST) architectural style, and use a scheme wherein a resource is addressed, and then a method is invoked on that resource. Further, in at least one embodiment, the API's are organized according to the following main categories:
Activities
Admin
AdminRoles
Clients
Comments
Contacts
Containers
Devices
Favorites
Files
Folders
LdapGroups
Licenses
Locations
Mail
Notifications
Permissions
Profiles
Roles
Scopes
Sources
SourceTypes
Tasks
Timezones
Tray
Users In at least one embodiment, all APIs can be called using the following uniform resource identifier (URI) scheme:
https://<hostname>/rest/<resource>/<endpoint>

In at least one embodiment, the API result is returned in JavaScript Object Notation (JSON) format. Developers using the SDK to develop a custom mobile app can make calls as needed to the RESTful Enterprise API's. This may allow the developer to incorporate secure, ubiquitous connectivity to content management systems, enterprise file sync and share, and enterprise scale and administration, as provided by the platform.

A third-party application developer creating a mobile application using the API's described herein may be able to achieve at least the same security benefits as are available for a mobile app internally developed by the vendor of the secure content platform 111. The developer may use the secure container 200 of the secure content platform 111 to achieve these benefits, thus avoiding the need for the developer to write his or her own secure container from scratch. The SDK described herein may thus provide a consumable layer in mobile and web programming languages, so as to ease the use and integration effort of developers to use Enterprise API's and/or other API's.

SDK Details

As indicated previously, the secure content platform 111 may be implemented through the use of an SDK. In at least one embodiment, the SDK supports basic API's to support login, retrieve metadata, securely store files, provide secure offline access, and/or provide secure viewing and editing. The SDK may use the enterprise application API's 268 on a server instance, as will be further described in connection with FIG. 2B, to provide the full set of content access, collaboration, synchronization and sharing capabilities, and/or other capabilities as described above.

In at least one embodiment, in order to prevent data leaks out of the secure container 200, viewing and editing of the secure content 112 may only be done only in the secure productivity suite 210, which may optionally be provided as part of the SDK. The SDK may include UI components such as those for user login and/or authentication and viewing and/or editing the secure content 112.

The SDK may provide enhanced security features. In at least one embodiment, the SDK may use two 256-bit symmetric keys, referred to as a Data Encryption Key (DEK) and a Gate Key (GK). The Data Encryption Key may be used to encrypt the files that are downloaded from the server, and the Gate Key may be used to protect the Data Encryption Key, and may also be used to protect the access token from the server and other sensitive data. In at least one embodiment, the Gate Key is dynamically generated and is not stored in the file system (i.e., in the data store 107 of the client device 108). Symmetric encryption may be performed using the AES-256 function.

In at least one embodiment, the SDK also supports a user-selected PIN with a fixed length, such as 6 digits, and/or a password or other authentication mechanism. This PIN or other authentication mechanism may be used to authenticate the user and for Gate Key generation. Settings stored in the data store 106 of the server 110 may control whether the PIN or other authentication mechanism is required.

The Data Encryption Key may be used to encrypt files in the file system. In at least one embodiment, the key may be decrypted on demand using the Gate Key and then, when no longer needed, it may be cleared by setting it to all zeros. It may then be released from memory.

In at least one embodiment, the access token is decrypted when the application is launched or is brought to the foreground. It may be maintained in memory while the application is active and in the foreground. When the application is closed or moved to the background, the token may be zeroed and released from memory.

The server 110 may specify the number of failed PIN entry attempts to allow before performing a "wipe" action to protect the content on the client device 108 by removing all downloaded files, the access token, user name, and server URL from the data store 107 (for example, from the secure container 200). In at least one embodiment, when these are deleted, they may first be set to all 0s, then all 1s, then all 0s, then deleted in order to prevent reads of the deleted data by forensic equipment. Other mechanisms can be used for ensuring that deleted data cannot be read. Because the device could be employee-owned and could therefore contain non-corporate data, the wipe action may advantageously delete only data in the secure container 200, where the corporate data has been secured.

When the user requests to view, edit, or otherwise manipulate a file of the secure content 112, the file may be decrypted in memory, and the decrypted buffer may be passed to the secure productivity suite 210. In at least one embodiment, to ensure security, the decrypted file is never written to the file system of the data store 107 of the client device 108.

The following is an example of a code snippet for instantiating the editor and providing an entry point to view and/or edit the file, according to one embodiment:

```
/* Initialize the mobile productivity suite application */
    if (file == nil) {
        picsel = [[PicselWrapper alloc] init];
    }
    else {
        picsel = [[PicselWrapper alloc] initWithFile:file
view:Picsel_ViewsType_Default];
    }
    /* Show the mobile productivity suite application */
    UIViewController *picselController = [picsel getViewControl-
```

-continued

```
ler];
    [ACAppDelegate.rootViewController presentEdit-
FileVC:picselController animated:NO completion:nil];
    [self showLoadingScreen];
```

Figure 2B:
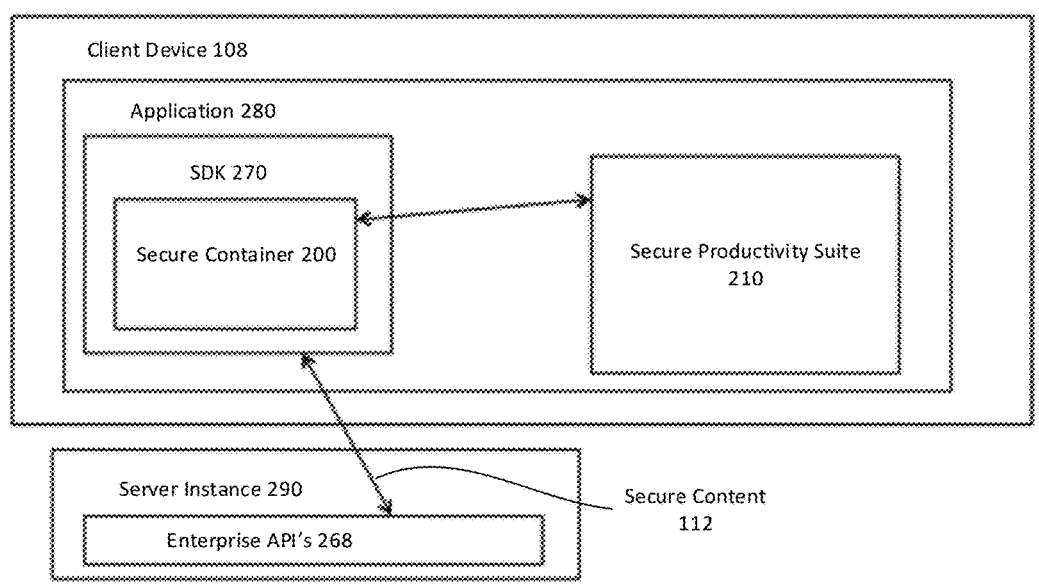
FIG. 2B is a block diagram depicting one manner in which a software developer's kit may be used to provide and/or function in cooperation with various data structures of FIG. 2A.

Referring to FIG. 2B, a block diagram depicts one manner in which a software developer's kit (SDK 270) may be used to provide and/or function in cooperation with various data structures of FIG. 2A. In this embodiment, the SDK 270 may provide the secure container 200, and may, along with the secure productivity suite 210, be a portion of an application 280 generated by an enterprise through use of the SDK.

The secure content 112 may be passed between the enterprise application API's 268, which may be on a server instance 290 hosted by the provider of the SDK 270. The server instance 290 may provide ubiquitous, secure connectivity and access to the secure content 112, either on premises or in the cloud. The server instance 290 may utilize any of the first content source 242, the second content source 244, and/or the third content source 246, or may utilize data storage and/or transfer protocols specific to the provider of the SDK 270.

The enterprise application API's 268 may make the secure content 112 available, may provide collaboration features for users such as comments and/or tasks, and/or may provide the ability to structure, secure, and/or manage the secure content 112. The enterprise application API's 268 may also provide features for administering the secure content platform 111 itself.

The application 280 may be a custom application developed by the enterprise, or by the provider of the SDK 270. It may operate as an "app" that runs on the operating system of the client device 108, such as an iPhone "app" that runs on Apple iOS. It may provide content-related functionality such as managing work orders and maintenance notes for a field service technician's app, or managing claims forms and damage photos for an insurance adjuster's app.

The secure productivity suite 210 may be embedded in the application 280, and may provide the ability for the user of the application 280 to view, edit, annotate, and/or otherwise manipulate documents of the secure content 112. Such documents may include, but are not limited to, PDF files, MS Word documents, PowerPoint documents, and Excel files.

The SDK 270 may provide abstraction and may simplify calls from the application 280 to the enterprise application API's 268. The application 280 may access and/or manipulate the state of the server instance 290 and the secure content 112 stored on the server instance 290 exclusively via the enterprise application API's 268. The application 280 may make secure calls to the SDK 270, which in turn may manipulate the secure container 200 and/or make calls to the enterprise application API's 268 to complete the requested action.

The secure container 200 may provide security for the secure content 112 to be stored on the client device 108. The secure content 112 may be the data that the application 280 has requested to be uploaded from the server 110, or from the server instance 290 via the enterprise application API's 268. The secure productivity suite 210 may read a document of the secure content 112 from the secure container 200 to allow the user to view it, and if the user changes the document, it may be stored back in the secure container 200. The user may also create new content, which the application

280 may store in the secure container 200, and possibly upload to the server instance 290.

The entire process may advantageously be "leak-proof," meaning that there may be no way for the user or a third-party to capture the secure content 112 outside the application 280. The secure container 200 may encrypt the data at rest, so the data at rest is not even accessible if the operating system of the client device 108 has been compromised or the client device 108 has been disassembled. Further, an administrator may issue a "remote wipe" command to delete the contents of the secure container 200.

Secure Content Retrieval, Storage, Manipulation, and Deletion

Figure 3:
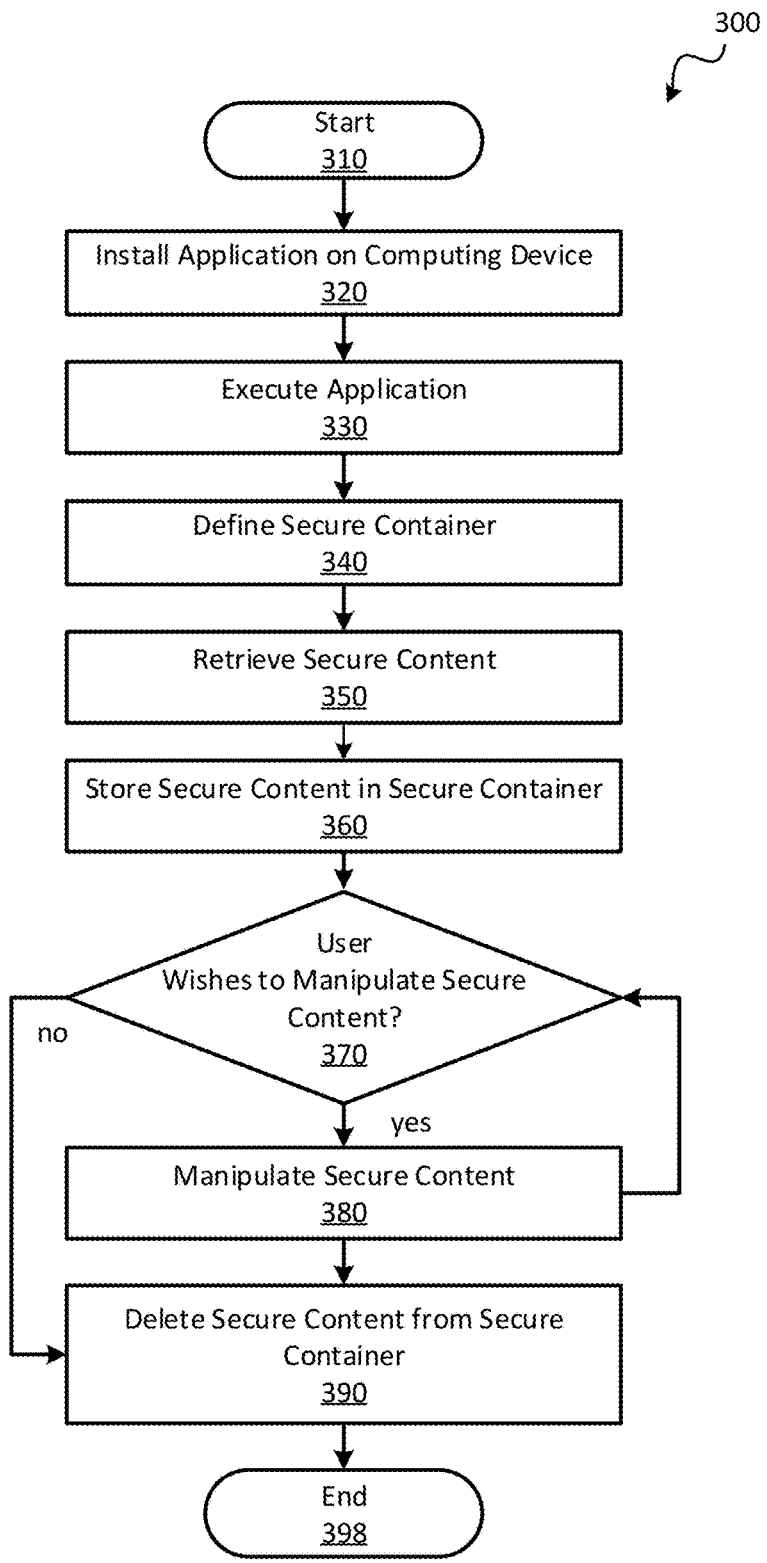
FIG. 3 is a flowchart diagram depicting a method for retrieving, storing, manipulating, and deleting secure content, according to one embodiment.

Referring to FIG. 3, a flowchart diagram illustrates a method 300 of retrieving, storing, manipulating, and/or deleting the secure content 112, according to one embodiment. The method 300 may be carried out through the use of the client device 108 and the server 110 of FIG. 1B and may involve use of the data structures of FIG. 2A and/or FIG. 2B, as will be described by way of example below. Additionally or alternatively, other systems may be used to carry out the method 300. Further, a system such as the client/server system of FIG. 1B and/or the data structures of FIGS. 2A and 2B may be used to carry out other methods besides the method 300 of FIG. 3.

As shown, the method 300 may start 310 with a step 320 in which an application developed through the use of the SDK is installed on a computing device, such as the client device 108 of FIG. 1B. This may be done by the user of the client device 108, or by another individual such as an IT administrator or the like. In a step 330, the application may be executed on the client device 108.

In a step 340, the secure container 200 may be defined in the data store 107 of the client device 108. This may be done, for example, by designating a block of memory addresses as the secure container 200. A memory storage policy may be enacted to cause the secure content 112 and content derived from the secure content 112 to be stored only in the secure container 200, and not in any other portion of the data store 107. Further, if desired, such a memory storage policy may cause the secure container 200 to be used only for the secure content 112 and/or content derived from the secure content 112.

In a step 350, the secure content 112 (or some portion thereof) may be retrieved from the server 110. This may be done through the use of any known file transfer protocol, but may advantageously be done through the use of a secure file transfer protocol. In a step 360, the retrieved portion of the secure content 112 may be stored in the secure container 200 of the data store 107 that was defined in the step 340.

In a query 370, a determination may be made as to whether the user wishes to manipulate any portion of the secure content 112 that has been stored in the secure container 200. Manipulation of the secure content 112 may include any of various activities, including but not limited to:

Editing the secure content 112;
Sharing the secure content 112;
Copying the secure content 112;
Editing metadata, security, or file settings of the secure content 112;
Viewing, printing, or otherwise outputting the secure content 112;
Synchronizing the secure content 112 with secure content 112 stored elsewhere; and
Deleting the secure content 112.

If the user wishes to manipulate the secure content 112, then in a step 380, the secure content 112 may be manipulated in the manner desired. This may be done, for example, through the use of the secure productivity suite 210 and/or through the use of an enterprise application such as the first enterprise application 262, the second enterprise application 264, and/or the third enterprise application 266. The user may use the interface provided by the secure productivity suite 210, the first enterprise application 262, the second enterprise application 264, and/or the third enterprise application 266 to provide input regarding the desired manipulation. The enterprise application API's 268 may enable the application that receives the command to manipulate the secure content 112 in the manner desired.

The method 300 may then return to the query 370 and iterate through the query 370 and the step 380 until the user does not wish to further manipulate the secure content 112. When the user has finished manipulating the secure content 112, then in a step 390, the secure content 112 may be deleted from the secure container 200. The method 300 may then end 398.

Deletion of the secure content 112 may be done manually and/or automatically. In some embodiments, the user may close the application that was used to manipulate the secure content 112, and this action may trigger automatic deletion of the secure content 112. In other embodiments, the secure content 112 may be deleted by the user of a different computing device, such as another client device 108. For example, when an employee who has been using his or her personal device to manipulate secure content 112 owned by an enterprise terminates his or her employment with the enterprise, an IT administrator of the enterprise may enter a command that causes deletion of all of the secure content 112 stored on the client device 108 owned by the employee to ensure that the employee no longer has access to the secure content 112.

Examples

The method 300 of FIG. 3 may be implemented in various applications and/or various user interfaces. One example of an application that uses secure content 112 to facilitate the provision of medical care will be shown and described in connection with FIGS. 4A through 4T, as follows.

In this use case, secure content from within and from outside a hospital is retrieved, stored, and manipulated in the context of an "ER App" reference application that may be generated through the use of the SDK described herein. The use case involves implementation of a reference application for use in a hospital emergency room, using Google Glass with secure content as described herein.

Thus, the client device 108 in this implementation may be the Google Glass. The Google Glass may have or may be connected to input devices 102 such as a bar code or QR code scanner and a microphone through which voice messages can be received and converted to text-based content. The Google Glass may also include a document viewer that facilitates secure sending and requesting of files.

Figure 4A:
FIGS. 4A through 4T are screenshot diagrams depicting a use case according to one embodiment, in which secure content from within and from outside a hospital is retrieved, stored, and manipulated.
Figure 4B:
Figure 4C:
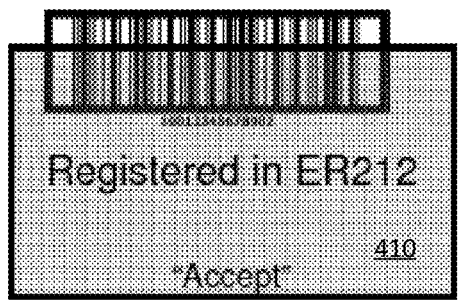
Figure 4D:
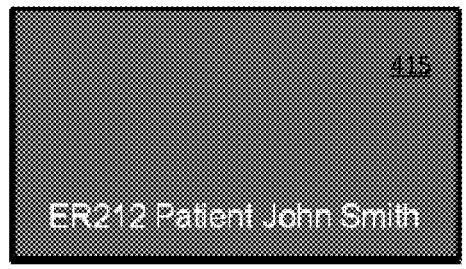
Figure 4E:
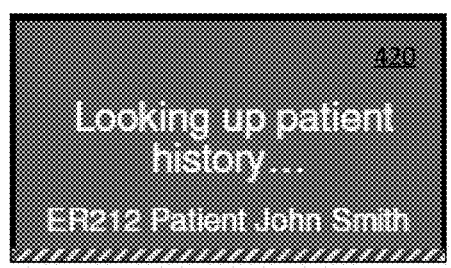
Figure 4F:
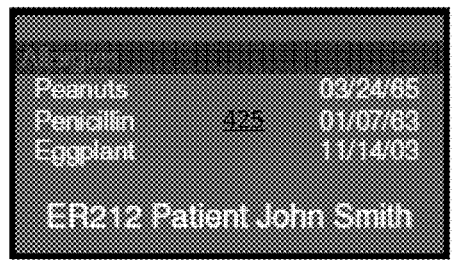
Figure 4F:
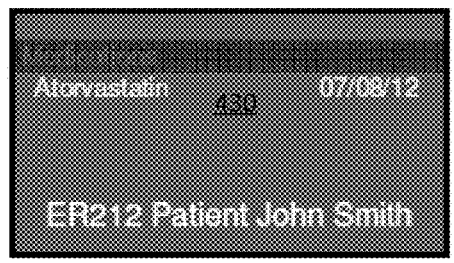
Figure 4F:
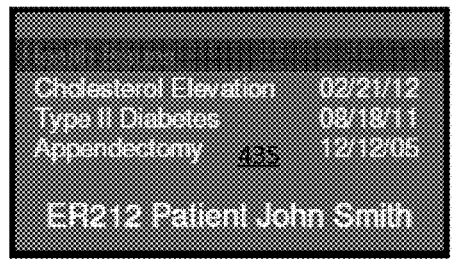
Figure 4F:
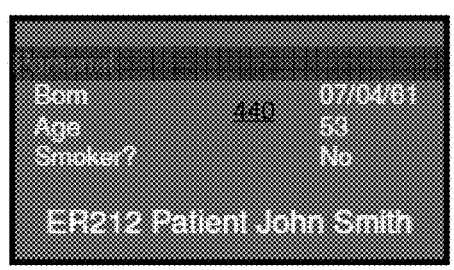
Figure 4G:
Figure 4H:
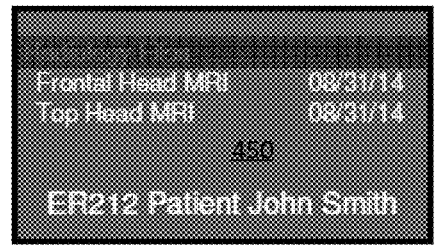
Figure 4J:
Figure 4I:
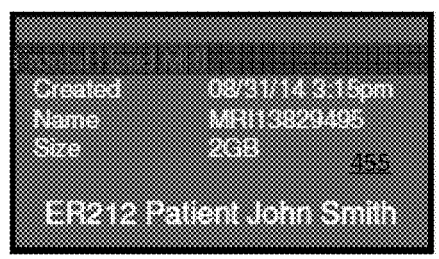
Figure 4I:
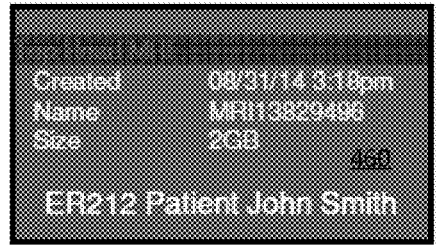
Figure 4K:
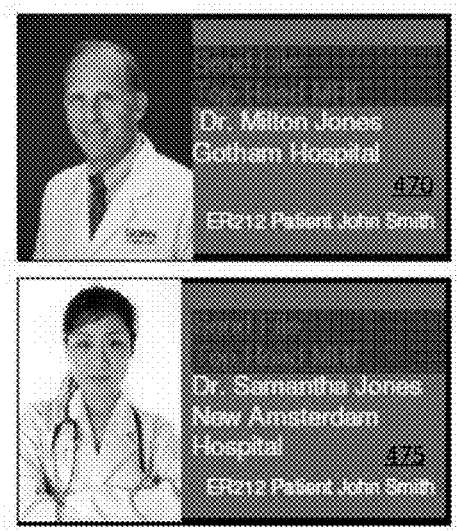
Figure 4L:
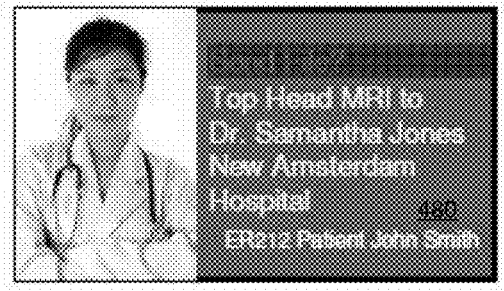
Figure 4M:
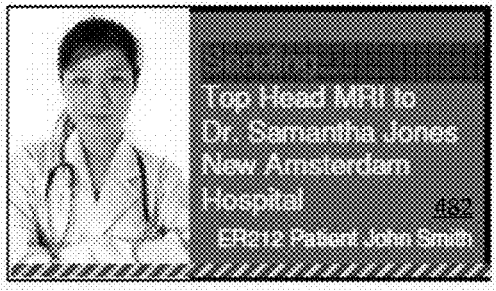
Figure 4N:
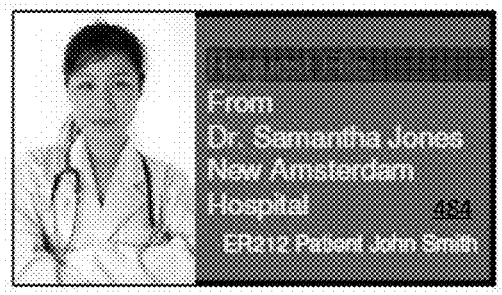
Figure 4O:
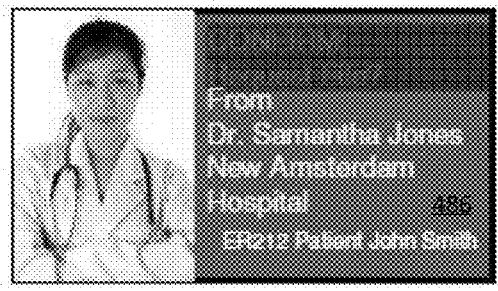
Figure 4P:
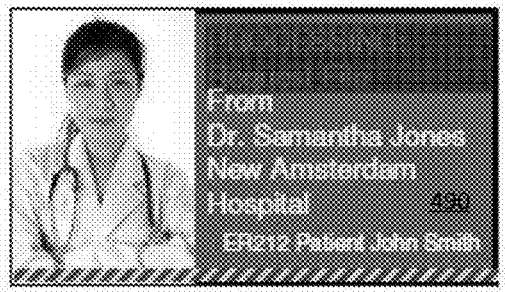
Figure 4Q:
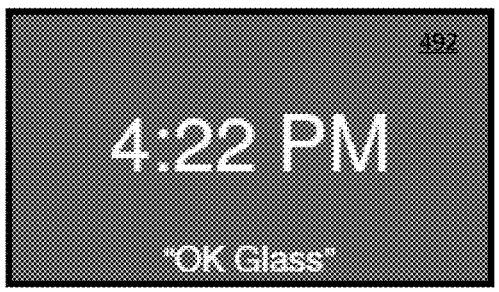
Figure 4R:
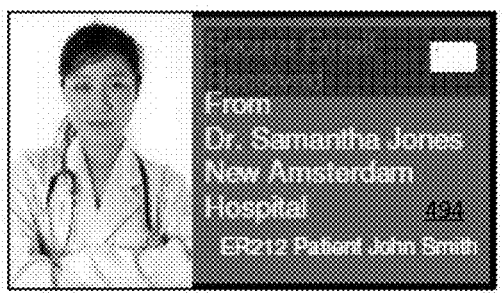
Figure 4S:
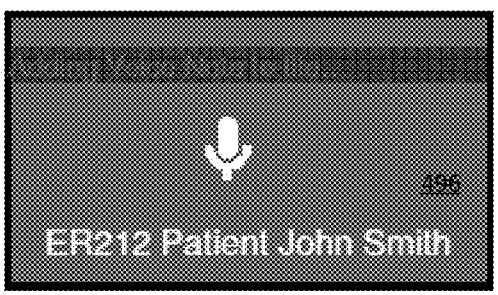
Figure 4T:
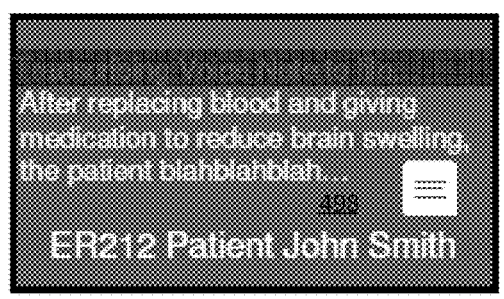

Referring to FIGS. 4A through 4T, screenshot diagrams 400, 405, 410, 415, 420, 425, 430, 435, 440, 445, 450, 455, 460, 465, 470, 475, 480, 482, 484, 486, 490, 492, 494, 496, 498 depict a use case according to one embodiment. As described below, the use case illustrates secure content sharing outside the enterprise (i.e., the hospital), as well as secure enterprise content viewing from within the enterprise.

Patient Arrives

John Smith is admitted to the Gotham General Hospital with a head injury.

He is unconscious, so he can't help doctors, but his ID is on him so they know he is John Smith.

He is a patient of this hospital's medical group, so his records are available.

He is taken to Emergency Room 212.

The ER team updates the room status to indicate that John is in 212.

ER Doctor Alerted

Dr. Bruce Wayne is an ER doctor at Gotham General Hospital.

He is walking down a hall at the hospital toward the cafeteria, thinking he finally has a chance to get some lunch.

He is wearing his Google Glass.

He gets an alert (FIG. 4A). Since the Glass is on, he gets the alert not just on his phone in his pocket, but also in the Glass visual display he can see immediately.

Without having to take his phone out of his pocket, he heads toward Emergency Room 212.

Doctor Arrives in ER

When he arrives in Emergency Room 212, he sees the patient's trauma and asks a series of questions of the staff and EMTs.

He wants to use a medication, but is worried about interactions with existing medications, as well as allergies.

FIG. 4B shows the display during this time.

Doctor Registers Room to Access Records

Dr. Wayne wants to browse the patient's records himself, rather than having somebody else read them to him.

He points the Google Glass at the bar code on the wall that identifies ER212.

He says, "OK Glass" to wake it up, then "Register Emergency Room ID."

The Glass scans the bar code, and shows "Registered in ER212" (FIG. 4C). This information is known because the patient was entered in this room.

Bruce says "Accept" to make the registration take effect.

Registered Room and Patient Status Display

The app looks up which patient is registered in this room and finds that it is John Smith.

The app now shows the registered ER and patient across the footer of the screen. (FIG. 4D).

Ask for Medical Records

Bruce says, "Ok Glass" to get it ready.

Bruce says, "Patient History."

The system shows a busy indication (FIG. 4E).

Browse Through Medical Records

Glass now shows the allergies (FIG. 4F).

He swipes through multiple cards for showing "Medications," "Health Issues," and "Personal" information related to John Smith (FIG. 4F).

Dr. Wayne doesn't see any reason not to issue the medication to help stabilize the patient.

MRI Results

Dr. Wayne gets some other work done during the MRI. When it is compete, he receives an alert (FIG. 4G).

He taps to see the list of files (FIG. 4H).

He speaks to the radiologist on duty, who thinks the results are hard to interpret. She recommends running them past Dr. Jones, an expert on this type of trauma.

Selecting the MRI File to Send

Dr. Jones works at a different hospital, with a completely different records system.

Dr. Wayne wants to send the MRIs to Dr. Jones.

He talks to her briefly on the phone to make sure she is available to look at the MRIs and give her opinion.

Dr. Wayne Taps to get a breakdown of the files so he can take action on each one (FIG. 4I).

He swipes to get to the card for the top view.

Preparing to Send the MRI File

Dr. Wayne taps on the "Top Head MRI" (FIG. 4J).

This shows a menu of choices for what he can do with this file

Dr. Wayne chooses "Send MRI File."

Choosing a Contact

Dr. Jones is already in the Dr. Wayne's phone contacts. For contacts who are not already stored, they may be entered via a different client device, such as a phone or computer, as the Google Glass may not provide the optimal interface for text entry. Dr. Wayne may keep his set of contacts very limited to facilitate search with the interface provided by Google Glass.

Dr. Wayne searches contacts verbally: "Send to Dr. Jones."

It lists all of Dr. Wayne's entries for contacts with names similar to what he said (FIG. 4K).

Dr. Wayne swipes through the list and taps on Dr. Samantha Jones at New Amsterdam Hospital.

Confirmation

The Glassware asks Dr. Wayne to confirm that he is sending the top view to Dr. Jones (FIG. 4L).

He taps to confirm.

Sending . . .

Google Glass shows progress, and also keeps up the photo of whom he sent it to, since it is sensitive information (FIG. 4M).

Dr. Jones Receives and Analyzes the MRI

Dr. Jones is not employed at the hospital that hosts the secure content platform 111 operating on Dr. Wayne's Google Glass, so she has the normal user experience for clients outside the organization.

If she is not already registered in the secure content platform 111, she will receive a registration email and respond to join the secure content platform 111 as an outside user, thereby enabling her to receive and/or manipulate secure content 112 from the secure content platform 111 in a limited fashion. This might be carried out on the web or a mobile app operating on a device used by Dr. Jones, but may not be carried out on her Google Glass.

Dr. Jones will receive the file as a link in another email, which, depending on the platform she used, may open via the web or an app developed as part of the secure content platform 111 designed for use by people outside the enterprise.

She examines the MRI and writes an opinion in an MS Word document.

Request File from Dr. Samantha Jones

In order to securely send back the results, Dr. Samantha Jones needs a way to send it via the secure content platform 111. Since she is not an internal user of the secure content platform 111, Dr. Wayne will send her a Request File email via functionality provided by the secure content platform 111.

"OK Glass, request file from Dr. Samantha Jones." (FIG. 4N).

Glass shows him a screen with "Request File" so he knows what the operation is, who he's requesting from, and whose information it will be stored with (Patient John Smith).

Confirmation
    The Glassware asks for a confirmation that these pieces of information are correct (FIG. 4O).
    Dr. Wayne taps to confirm.
Processing Request File . . .
    The Glass now processes the Request File action. It shows progress, and also keeps up the photo of who he sent it to, since it is sensitive information (FIG. 4P).
    On her end, Dr. Jones has the normal email experience for a user who is outside the enterprise that operates the secure content platform 111. She receives the Request File email, attaches the document containing her analysis, and sends it back.
Doctor does Other Work
    While waiting for Dr. Jones to get back to him, Dr. Wayne works with another patient. He may also use different Glassware (Glass apps) during this time.
    His client device 108 (i.e., the Glassware running on his Google Glass) may lose the context of which room he is working in, who is the patient, etc.
    FIG. 4Q shows the display during this time.
Secure Mail Received
    When the mail comes back, Dr. Wayne receives an alert (FIG. 4R).
    By tapping on it, he restores the context of Patient John Smith.
    The tap also opens the first two lines of any message she wrote in the email. He now has a choice of "read more" to see more of her text, "read aloud" to hear her message, or "view attachment."
    He chooses "view attachment" and gets a viewer image of the document she sent. There may be the option for him to scroll through the document; for example, it may be paginated into separate cards that he swipes through.
Add Voice Note to File
    Based on Dr. Jones' advice, Dr. Wayne treats the patient and makes progress on his condition.
    Next, he needs to add some notes to his file. He wants to do it while he is working with the patient, so he'd like to do it hands-free on the Glass.
    "Okay Glass, dictate note in John Smith's record"
    He adds a voice note (FIG. 4S).
    When the note completes, he has the option to convert to text and review what he wrote (FIG. 4T).

The use case presented above is one reference application illustrating how the secure content platform 111 of the present disclosure can help ER doctors collaborate with other doctors and technicians in a secure way and receive patient information without having to turn their eyes or attention from the patient.

The SDK described herein may thus enable customers and partners to build many such applications (i.e., secure content platforms) to solve problems of collaboration and content access. The SDK may help the application developer to customize a secure content platform to the needs of an enterprise and, if desired, develop an ecosystem that facilitates collaboration with individuals outside the enterprise.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Wash.; Mac OS X, available from Apple Inc. of Cupertino, California; iOS, available from Apple Inc. of Cupertino, Calif.; Android, available from Google, Inc. of Mountain View, Calif.; and/or any other operating system that is adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A method for manipulating secure content on a first computing device through use of a software developer's kit, the method comprising:
    at a processor, defining a secure container comprising a subset of a data store of the first computing device;
    at the processor, executing first instructions of a plurality of instructions of the software developer's kit to retrieve secure content from a first content source of a plurality of content sources from which data can be retrieved through the use of the plurality of instructions, wherein the plurality of content sources are managed by a plurality of different entities;
    at the data store, storing the secure content in the secure container;
    at the processor, using a data encryption key to encrypt the secure content within the secure container;
    at the processor, using a dynamically generated gate key to encrypt the data encryption key;
    storing the encrypted data encryption key at a server;
    at an input device, receiving user input, the user input comprising an authentication mechanism; and
    at the processor, responsive to receipt of the user input:
        using the authentication mechanism to generate the gate key;
        retrieving the stored encrypted data encryption key from the server;
        using the gate key to decrypt the data encryption key;
        using the decrypted data encryption key to decrypt the secure content;
        manipulating the secure content in a manner that avoids storage of any of the secure content on a portion of the data store outside the secure container; and
        encrypting the manipulated content using the decrypted data encryption key;
    wherein the software developer's kit is usable to define the secure container at multiple computing devices to manipulate the secure content in a manner that avoids storage of any of the secure content on any data store outside the secure container.

2. The method of claim 1, wherein each of the plurality of content sources is selected from the group consisting of SharePoint, Windows File Shares, ECMs, Dropbox, OneDrive, Google Drive, and Box.

3. The method of claim 1, wherein the secure container comprises an encrypted virtual container.

4. The method of claim 1, further comprising, at the data store, after manipulation of the secure content, deleting the secure content from the secure container.

5. The method of claim 4, further comprising, at the processor, receiving an instruction transmitted to the first computing device from a second computing device distinct from the first content source;
    and wherein deleting the secure content from the secure container comprises, at the processor, causing the data store to delete the secure content in response to receipt of the instruction without deleting any content stored outside the secure container.

6. The method of claim 1, further comprising, at the processor:
    installing, on the first computing device, an application developed through use of the software developer's kit; and executing the application;
wherein defining the secure container is carried out in response to execution of the application.

7. The method of claim 1, wherein the software developer's kit comprises a secure productivity suite;
wherein manipulating the secure content comprises using exclusively the secure productivity suite to manipulate the secure content;
and wherein the method further comprises, at the processor, causing any productivity suite operating on the first computing device that is not the secure productivity suite to be unable to manipulate the secure content.

8. The method of claim 7, wherein manipulating the secure content comprises editing at least one document of the secure content to generate an edited document;
wherein the method further comprises, at the processor, storing the edited document in the secure container.

9. The method of claim 8, wherein the document is selected from the group consisting of Microsoft Office Documents and annotated PDF files.

10. The method of claim 8, further comprising synchronizing the edited document with the first content source.

11. The method of claim 1, wherein manipulating the secure content comprises transmitting a copy of at least one document of the secure content to a second computing device distinct from the first content source.

12. The method of claim 11, wherein manipulating the secure content comprises receiving, from a second computing device distinct from the first content source, changes made to a document of the secure content at the second computing device;
wherein the method further comprises storing the changes in the secure container in association with the document.

13. The method of claim 1, wherein the first computing device comprises a mobile device selected from the group consisting of smartphones, tablets, phablets, and Google Glass devices.

14. A non-transitory computer-readable medium for manipulating secure content on a first computing device through use of a software developer's kit, comprising instructions stored thereon, that when executed by a processor, perform the steps of:
defining a secure container comprising a subset of a data store of the first computing device;
executing first instructions of a plurality of instructions of the software developer's kit to retrieve secure content from a first content source of a plurality of content sources from which data can be retrieved through the use of the plurality of instructions, wherein the plurality of content sources are managed by a plurality of different entities;
causing the data store to store the secure content in the secure container;
using a data encryption key to encrypt the secure content within the secure container;
using a dynamically generated gate key to encrypt the data encryption key;
causing a server to store the encrypted data encryption key;
causing an input device to receive user input, the user input comprising an authentication mechanism; and
responsive to receipt of the user input:
using the authentication mechanism to generate the gate key;
retrieving the stored encrypted data encryption key from the server;
using the gate key to decrypt the data encryption key;
using the decrypted data encryption key to decrypt the secure content;
manipulating the secure content in a manner that avoids storage of any of the secure content on a portion of the data store outside the secure container; and
encrypting the manipulated content using the decrypted data encryption key;
wherein the software developer's kit is usable to define the secure container at multiple computing devices to manipulate the secure content in a manner that avoids storage of any of the secure content on any data store outside the secure container.

15. The non-transitory computer-readable medium of claim 14, further comprising instructions stored thereon, that when executed by a processor, perform the steps of:
causing the data store, after manipulation of the secure content, to delete the secure content from the secure container; and
receiving an instruction transmitted to the first computing device from a second computing device distinct from the first content source;
and wherein deleting the secure content from the secure container comprises causing the data store to delete the secure content in response to receipt of the instruction without deleting any content stored outside the secure container.

16. The non-transitory computer-readable medium of claim 14, further comprising instructions stored thereon, that when executed by a processor, perform the steps of:
installing, on the first computing device, an application developed through use of the software developer's kit; and
executing the application;
wherein defining the secure container is carried out in response to execution of the application.

17. The non-transitory computer-readable medium of claim 14, wherein the software developer's kit comprises a secure productivity suite;
wherein manipulating the secure content comprises using exclusively the secure productivity suite to manipulate the secure content;
and wherein the non-transitory computer-readable medium further comprises instructions stored thereon that, when executed by a processor, cause any productivity suite operating on the first computing device that is not the secure productivity suite to be unable to manipulate the secure content.

18. The non-transitory computer-readable medium of claim 17, wherein manipulating the secure content comprises editing at least one document of the secure content to generate an edited document;
wherein the non-transitory computer-readable medium further comprises instructions stored thereon, that when executed by a processor, perform the steps of:
storing the edited document in the secure container; and
synchronizing the edited document with the first content source;
and wherein the document is selected from the group consisting of Microsoft Office Documents and annotated PDF files.

19. The non-transitory computer-readable medium of claim 14, wherein manipulating the secure content comprises transmitting a copy of at least one document of the secure content to a second computing device distinct from the first content source;

wherein manipulating the secure content comprises receiving, from a second computing device distinct from the first content source, changes made to a document of the secure content at the second computing device;

and wherein the non-transitory computer-readable medium further comprises instructions stored thereon, that when executed by a processor, store the changes in the secure container in association with the document.

20. The non-transitory computer-readable medium of claim 14, wherein the first computing device comprises a mobile device selected from the group consisting of smartphones, tablets, phablets, and Google Glass devices.

21. A system for manipulating secure content on a first computing device through use of a software developer's kit, the system comprising:
a processor configured to:
define a secure container comprising a subset of a data store of the first computing device;
execute first instructions of a plurality of instructions of the software developer's kit to retrieve secure content from a first content source of a plurality of content sources from which data can be retrieved through the use of the plurality of instructions, wherein the plurality of content sources are managed by a plurality of different entities;
use a data encryption key to encrypt the secure content within the secure container;
use a dynamically generated gate key to encrypt the data encryption key; and
cause a server to store the encrypted data encryption key;
the data store, communicatively coupled to the processor and configured to store the secure content in the secure container; and
an input device communicatively coupled to the processor, configured to receive user input, the user input comprising an authentication mechanism;
wherein the processor is further configured, responsive to receipt of the user input, to:
use the authentication mechanism to generate the gate key;
retrieve the stored encrypted data encryption key from the server;
use the gate key to decrypt the data encryption key;
use the decrypted data encryption key to decrypt the secure content;
manipulate the secure content in a manner that avoids storage of any of the secure content on a portion of the data store outside the secure container; and
encrypt the manipulated content using the decrypted data encryption key;
wherein the software developer's kit is usable to define the secure container at multiple computing devices to manipulate the secure content in a manner that avoids storage of any of the secure content on any data store outside the secure container.

22. The system of claim 21, wherein the data store is further configured, after manipulation of the secure content, to delete the secure content from the secure container;
and wherein the processor is further configured to:
receive an instruction transmitted to the first computing device from a second computing device distinct from the first content source; and
cause the data store to delete the secure content from the secure container in response to receipt of the instruction without deleting any content stored outside the secure container.

23. The system of claim 21, wherein the processor is further configured to:
install, on the first computing device, an application developed through use of the software developer's kit; and
execute the application;
wherein the processor is configured such that the secure container is defined in response to execution of the application.

24. The system of claim 21, wherein the software developer's kit comprises a secure productivity suite;
and wherein the processor is further configured to use exclusively the secure productivity suite to manipulate the secure content;
and wherein the processor is further configured to cause any productivity suite operating on the first computing device that is not the secure productivity suite to be unable to manipulate the secure content.

25. The system of claim 24, wherein the processor is further configured to manipulate the secure content by editing at least one document of the secure content to generate an edited document;
and wherein the processor is further configured to:
store the edited document in the secure container; and
synchronize the edited document with the first content source;
and wherein the document is selected from the group consisting of Microsoft Office Documents and annotated PDF files.

26. The system of claim 21, wherein the processor is further configured to manipulate the secure content by:
transmitting a copy of at least one document of the secure content to a second computing device distinct from the first content source; and
receiving, from a second computing device distinct from the first content source, changes made to a document of the secure content at the second computing device;
wherein the processor is further configured to store the changes in the secure container in association with the document.

27. The system of claim 21, wherein the first computing device comprises a mobile device selected from the group consisting of smartphones, tablets, and phablets, and Google Glass devices.

* * * * *